United States Patent
Kobayashi et al.

(10) Patent No.: US 12,084,562 B2
(45) Date of Patent: Sep. 10, 2024

(54) SEALER, METHOD OF ITS PRODUCTION AND ALL-SOLID-STATE SECONDARY BATTERY

(71) Applicants: TOYO SEIKAN GROUP HOLDINGS, LTD., Tokyo (JP); TOYO SEIKAN CO., LTD., Tokyo (JP)

(72) Inventors: Tomokazu Kobayashi, Tokyo (JP); Daisuke Imoda, Yokohama (JP); Shuji Nakano, Yokohama (JP)

(73) Assignees: TOYO SEIKAN GROUP HOLDINGS, LTD., Tokyo (JP); TOYO SEIKAN CO., LTD., Tokyo (JP)

( * ) Notice: Subject to any disclaimer, the term of this patent is extended or adjusted under 35 U.S.C. 154(b) by 624 days.

(21) Appl. No.: 17/416,961

(22) PCT Filed: Nov. 25, 2019

(86) PCT No.: PCT/JP2019/045950
§ 371 (c)(1),
(2) Date: Jun. 21, 2021

(87) PCT Pub. No.: WO2020/137298
PCT Pub. Date: Jul. 2, 2020

(65) Prior Publication Data
US 2022/0077529 A1    Mar. 10, 2022

(30) Foreign Application Priority Data
Dec. 26, 2018   (JP) .................................. 2018-242530

(51) Int. Cl.
*H01M 50/193*    (2021.01)
*C08K 3/08*    (2006.01)
(Continued)

(52) U.S. Cl.
CPC .................. *C08K 9/04* (2013.01); *C08K 3/08* (2013.01); *C08K 5/098* (2013.01);
(Continued)

(58) Field of Classification Search
None
See application file for complete search history.

(56) References Cited

U.S. PATENT DOCUMENTS

| 2010/0178554 A1 | 7/2010 | Hama |
| 2011/0028313 A1 | 2/2011 | Ohashi et al. |

FOREIGN PATENT DOCUMENTS

| CN | 101730950 A | 6/2010 |
| CN | 101959537 A | 1/2011 |

(Continued)

OTHER PUBLICATIONS

International Search Report for PCT/JP2019/045950 dated Feb. 4, 2020 [PCT/ISA/210].
(Continued)

*Primary Examiner* — Carlos Barcena
(74) *Attorney, Agent, or Firm* — Sughrue Mion, PLLC

(57) ABSTRACT

A sealer for use in an all-solid-state secondary battery provided with a sulfur-containing solid electrolyte, characterized in that the sealer contains a resin and a particulate fatty acid metal salt dispersed in the resin, and the particulate fatty acid metal salt is a particulate fatty acid metal salt in which a fatty acid is coordinated on the surfaces of the metal particles having a mean particle diameter of not more than 1000 nm. The all-solid-state secondary battery is capable of suppressing the generation of the hydrogen sulfide.

7 Claims, 1 Drawing Sheet

(51) Int. Cl.
*C08K 5/098* (2006.01)
*C08K 9/04* (2006.01)
*H01M 10/0562* (2010.01)
*H01M 10/52* (2006.01)
*H01M 50/141* (2021.01)
*H01M 50/191* (2021.01)
*H01M 50/195* (2021.01)
*H01M 50/197* (2021.01)

(52) U.S. Cl.
CPC ....... *H01M 10/0562* (2013.01); *H01M 10/52* (2013.01); *H01M 50/141* (2021.01); *H01M 50/191* (2021.01); *H01M 50/193* (2021.01); *H01M 50/195* (2021.01); *H01M 50/197* (2021.01); *C08K 2003/0806* (2013.01); *H01M 2300/0068* (2013.01)

(56) References Cited

FOREIGN PATENT DOCUMENTS

| CN | 103746083 A | 4/2014 |
| JP | 2000-225180 A | 8/2000 |
| JP | 2008-103288 A | 5/2008 |
| JP | 2011-124084 A | 6/2011 |
| JP | 2013-222644 A | 10/2013 |

OTHER PUBLICATIONS

Chinese Office Action dated Nov. 9, 2023 in corresponding Application No. 201980086280.3.

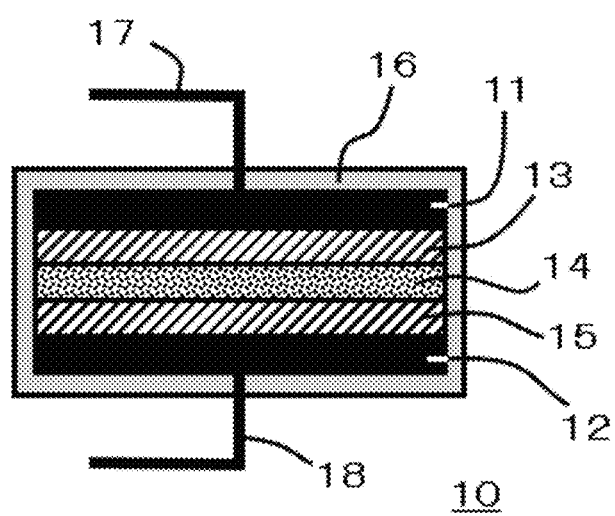

SEALER, METHOD OF ITS PRODUCTION AND ALL-SOLID-STATE SECONDARY BATTERY

CROSS REFERENCE TO RELATED APPLICATIONS

This application is a National Stage of International Application No. PCT/JP2019/045950 filed Nov. 25, 2019, claiming priority based on Japanese Patent Application No. 2018-242530 filed Dec. 26, 2018.

TECHNICAL FIELD

This invention relates to a sealer, a method of its production and an all-solid-state secondary battery. More specifically, the invention relates to a sealer capable of efficiently trapping sulfur released from an all-solid-state secondary battery that is provided with a sulfur-containing solid electrolyte, and to an all-solid-state secondary battery which is provided with the sealer and suppresses the generation of the hydrogen sulfide.

BACKGROUND ART

Secondary cells have been used for such automobiles as electric cars and hybrid cars, as well as for such information terminals as personal computers, personal digital assistances, etc., and it has been desired to further increase their capacities and safety yet suppressing their sizes. Among the secondary batteries, the all-solid-state secondary batteries using solid electrolyte feature a high level of safety at high temperatures since they use no organic electrolyte. Moreover, the all-solid-state secondary batteries are produced through a vacuum process and can, therefore, be easily realized in the form of thin films. In recent years, from the standpoint of obtaining a high ionic conductivity, it is a practice to use a sulfur-containing solid electrolyte as the solid electrolyte.

In the all-solid-state secondary battery provided with the sulfur-containing solid electrolyte, however, the sulfur passes through the sealer that covers the solid electrolyte and reacts with the water in the atmosphere often giving rise to the generation of the hydrogen sulfide. To suppress the generation of the hydrogen sulfide, for example, a patent document 1 proposes a sealer that contains any one of Zn, Cu, Fe, Cd or Cl and, further, contains a trapping material for trapping the sulfur.

PRIOR ART DOCUMENTS

Patent Documents

Patent document 1: JP-A-2013-222644

OUTLINE OF THE INVENTION

Problems to be Solved by the Invention

According to the technology described in the patent document 1, however, the sealer must contain the trapping material at a ratio of 10 to 20% to efficiently suppress the generation of the hydrogen sulfide and is, therefore, still not fully satisfactory in regard to its electric insulation and formability. Therefore, it has been desired to further improve the sealer for use in the all-solid-state secondary batteries that are provided with the sulfur-containing solid electrolyte.

It is an object of the present invention to provide a sealer for use in an all-solid-state secondary battery, the sealer being capable of efficiently suppressing the generation of the hydrogen sulfide, as well as to provide an all-solid-state secondary battery equipped with the sealer.

Means for Solving the Problems

According to the present invention, there is provided a sealer for use in an all-solid-state secondary battery provided with a sulfur-containing solid electrolyte, characterized in that:
  the sealer contains a resin and a particulate fatty acid metal salt dispersed in the resin; and
  the particulate fatty acid metal salt is a particulate fatty acid metal salt in which a fatty acid is coordinated on the surfaces of the metal particles having a mean particle diameter of not more than 1000 nm.
In the sealer of the present invention, it is desired that:
  1. The particulate fatty acid metal salt is contained in the sealer in an amount of from 0.0005 to 5% by mass;
  2. The resin is at least the one selected from the group consisting of polyimide, polyamide-imide, polyether ether ketone (PEEK) and liquid crystal polymer (LCP);
  3. The fatty acid in the fatty acid metal salt is at least the one selected from the group consisting of lauric acid, myristic acid, palmitic acid, oleic acid, linoleic acid, linolenic acid, stearic acid, arachidic acid and behenic acid; and
  4. The metal in the fatty acid metal salt is at least the one selected from the group consisting of silver, copper, nickel, cobalt, gold and palladium.

According to the present invention, there is further provided an all-solid-state secondary battery comprising a positive electrode, a negative electrode, the above-mentioned solid electrolyte arranged between the positive electrode and the negative electrode, and the above-mentioned sealer of the invention.

The all-solid-state secondary battery of the present invention is, more preferably, provided with a water-barrier layer that covers at least part of the sealer.

According to the present invention, furthermore, there is provided a method of producing a sealer for use in an all-solid-state secondary battery provided with a sulfur-containing solid electrolyte, comprising the step of mixing together a resin and a particulate fatty acid metal salt in which a fatty acid covers the surfaces of the metal particles having a mean particle diameter of not more than 1000 nm.

Effects of the Invention

According to the present invention, it is made possible to provide the sealer that is capable of suppressing the generation of the hydrogen sulfide when it is used for the all-solid-state secondary battery that is provided with the sulfur-containing solid electrolyte, and to provide the all-solid-state secondary battery equipped with the sealer.

BRIEF DESCRIPTION OF THE DRAWING

The FIGURE is a sectional view schematically illustrating an example of an all-solid-state secondary battery according to the present invention.

EMBODIMENTS FOR CARRYING OUT THE INVENTION

The sealer according to the present invention is a sealer for use in the all-solid-state secondary battery that is provided with the sulfur-containing solid electrolyte. Here, the sealer contains a resin and a particulate fatty acid metal salt dispersed in the resin. Further, the particulate fatty acid metal salt has the fatty acid that is coordinated on the surfaces of the metal particles that have a mean particle diameter of not more than 1000 nm.

The invention has an important feature in that the sealer contains the particulate fatty acid metal salt in which the fatty acid is coordinated on the surfaces of the metal particles that have a mean particle diameter of not more than 1000 nm. Therefore, even in case the sulfur is released from the solid electrolyte, the particulate fatty acid metal salt reacts with the sulfur in the sealer; i.e., the sulfur is trapped and is caused to stay in the sealer. Accordingly, the sulfur is prevented from reacting with the water entering from the exterior and, as a result, it is made possible to decrease the generation of the hydrogen sulfide.

The particulate fatty acid metal salt used in the present invention has the fatty acid coordinated on the surfaces of the metal particles, preventing the particles from coagulating together and, therefore, being highly dispersed in the sealer. This reduces uneven blending. Therefore, despite a small amount of the particulate fatty acid metal salt contained in the sealer, the sulfur can be trapped to a sufficient degree. Moreover, since the fatty acid is present surrounding the metal particles, the sealer maintains electric insulation.

Moreover, the sealer of the invention has flexibility since it uses the resin as a base material and provides freedom for being worked. Besides, the sealer can be formed in a manner to undergo deformation to meet the expansion and contraction of the all-solid-state secondary battery when it is electrically charged or discharged. Here, the sealer covers at least part of the solid electrolyte and may, further, cover the solid electrolyte, the positive electrode and the negative electrode.

(Particulate Fatty Acid Metal Salt)

The particulate fatty acid metal salt contained in the sealer of the present invention has the fatty acid coordinated on the surfaces of the metal particles having a mean particle diameter of not more than 1000 nm. The fact that the fatty acid is coordinated on the surfaces of the metal particles can be confirmed from an infrared absorption peak appearing near 1518 cm$^{-1}$ (kayser) that stems from the bond of the fatty acid with the metal. As described above, the particulate fatty acid metal salt has the fatty acid coordinated on the surfaces of the metal particles, thereby suppressing the particles of the fatty acid metal salt from coagulating but causing no harm to the electric insulation of the sealer.

The mean particle diameter of the metal particles should be not more than 1000 nm, preferably, from 0.1 to 500 nm, more preferably, from 0.1 to 100 nm and, further preferably, from 0.1 to 50 nm. The mean particle diameter of the metal particles being not more than 50 nm helps increase the specific surface areas of the metal particles and hence helps improve the reactivity with the sulfur and, therefore, helps efficiently decrease the generation of the hydrogen sulfide.

Here, the mean particle diameter of the metal particles can be measured by using a transmission type electron microscope. The mean particle diameter of the individual metal particles can be found by selecting 50 metal particles in a random fashion, and measuring equivalent circle diameters of the projected areas of the metal particles by using the transmission type electron microscope, followed by averaging by the number (number-based mean diameter).

As the metal components in the fatty acid metal salt, there can be exemplified silver, copper, nickel, cobalt, gold, palladium, etc., and at least one of them can be used. Among them, silver and copper are preferred, and silver is most preferred. These metal components can be a simple metal, a mixture or an alloy thereof.

The fatty acid in the fatty acid metal salt may have been either saturated or unsaturated. The fatty acid should have carbon atoms in a number of, preferably, from 3 to 30, more preferably, from 8 to 20 and, further preferably, from 12 to 18. As the fatty acid, there can be exemplified decanoic acid, lauric acid, myristic acid, palmitic acid, oleic acid, linoleic acid, linolenic acid, stearic acid, arachidic acid and behenic acid. These fatty acids can be used in a single kind or in a combination of two or more kinds.

There is no specific limitation on the method of preparing the particulate fatty acid metal salt used in the sealer of the present invention, and any known method can be suitably employed. For example, there can be employed a method of blending a resin with a fatty acid metal salt and an acid-modified resin, and heating and mixing the blend thereof at a temperature lower than the temperature at which the fatty acid metal salt starts thermally decomposing (JP-A-2012-36282), and a method of adding a fatty acid metal salt and saccharin to a high-boiling solvent, heating and mixing them together to prepare a high-boiling solvent in which the particulate fatty acid metal salt is dispersed, mixing a low-boiling solvent to the high-boiling solvent in which the particulate fatty acid metal salt has been dispersed, separating the high-boiling solvent and the low-boiling solvent into two phases, and causing the particulate fatty acid metal salt to migrate into the low-boiling solvent from the high-boiling solvent (JP-A-2013-241643).

The particulate fatty acid metal salt should be contained in the sealer in an amount of, preferably, from 0.0005 to 5% by mass, more preferably, from 0.0005 to 1% by mass and, further preferably, from 0.0005 to 0.5% by mass. As described above, the particulate fatty acid metal salt contained in the sealer of the present invention has the fatty acid coordinated on the surfaces of the metal particles, thereby effectively preventing the fine metal particles from coagulating. The particulate fatty acid metal salt, therefore, is permitted to remain highly dispersed in the sealer. Accordingly, despite the particulate fatty acid metal salt contained in an amount of not more than 5% by mass, the sealer is capable of trapping the sulfur to a sufficient degree for extended periods of time. Furthermore, the particulate fatty acid metal salt contained in the sealer in an amount of not more than 5% by mass helps decrease the cost of production without impairing the electric insulation or the formability of the sealer. When the particulate fatty acid metal salt is contained in an amount of not less than 0.0005% by mass, the sealer becomes capable of trapping the sulfur released from the solid electrolyte to a sufficient degree.

(Resin)

The sealer of the invention contains the resin as a base material of the sealer. Namely, the resin serves as the matrix for dispersing the particulate fatty acid metal salt therein and, further, forms an insulation film that works as the sealer. The sealer comprising the resin is imparted with flexibility. Therefore, even when the all-solid-state secondary battery is expanded or contracted due to being electrically charged or discharged, the sealer undergoes deformation to meet the expansion or the contraction.

The all-solid-state secondary battery usually operates at temperatures of as high as 60 to 400° C. and, therefore, preferably uses the resin capable of withstanding high temperatures, such as polyimide, polyamide-imide, polyether ether ketone (PEEK), liquid crystal polymer (LCP) or the like. They can be used in a single kind or in a combination of two or more kinds. Use of the above resin helps prevent the sealer from being deteriorated over extended periods of time.

It is also allowable to use a photosensitive coating material as the resin. In forming the layer by applying the sealer onto the solid electrolyte, the photosensitive coating material makes it possible to execute the sealing by utilizing light such as UV without subjecting the electrodes to high temperatures. The photosensitive coating material can be suitably selected from the materials that have been known per se. without any specific limitation. Examples include coating materials for forming photosensitive insulating films, AH Series (trade names, Hitachi Kasei Co.), Falders (trade names, Toray Co.), etc.

In addition to the particulate fatty acid metal salts and resins described above, the sealer can, further, contain various known additives and reforming agents, as required, in amounts in ranges in which they do not impair the function of the sealer.

(Method of Producing the Sealer)

The method of producing the sealer according to the present invention includes the step of mixing together the resin and the particulate fatty acid metal salt in which the fatty acid is coordinated on the surfaces of the metal particles having a mean particle diameter of not more than 1000 nm.

The way of mixing the particulate fatty acid metal salt and the resin together is dependent upon the kind of the resin. When, for example, a thermoplastic resin is used, the fatty acid metal salt is added to the resin that is melted through the step of heat-forming, such as extrusion forming, injection forming or compression forming, followed by heating and stirring to thereby prepare a resin composition in which the particulate fatty acid metal salt is directly dispersed in the resin. Otherwise, the particulate fatty acid metal salt prepared by the above-mentioned method is mixed into the resin, and the mixture is kneaded. The resin composition comprising the particulate fatty acid metal salt and the resin prepared as described above can also be used as a master batch containing the particulate fatty acid metal salt at a high concentration.

When a liquid material such as a photosensitive coating material is used, the resin is blended with a low-boiling solvent in which the particulate fatty acid metal salt prepared by the method described above has been directly mixed or has been transferred.

(All-Solid-State Secondary Battery)

The all-solid-state secondary battery according to the present invention comprises a positive electrode, a negative electrode, a sulfur type solid electrolyte arranged between the positive electrode and the negative electrode, and the sealer of the invention. The all-solid-state secondary battery of the present invention uses the sealer that contains the above-mentioned particulate fatty acid metal salt and is, therefore, capable of suppressing the generation of the hydrogen sulfide.

The FIGURE illustrates an example of the all-solid-state secondary battery of the present invention. The all-solid-state secondary battery 10 illustrated in the FIGURE includes a positive electrode collector 11 and a negative electrode collector 12 that are arranged being separated away from each other. A positive electrode 13 is provided on the positive electrode collector 11. A negative electrode 15 is provided on the negative electrode collector 12.

Further, a solid electrolyte 14 is provided between the positive electrode 13 and the negative electrode 15. The material of the solid electrolyte 14 is a sulfur-containing material such as $Li_3PS_4$. A sealer 16 of the invention is so provided as to cover the whole body. The electricity is taken out through a take-out electrode 17 and a take-out electrode 18 connected to the positive electrode collector 11 and the negative electrode collector 12, respectively. The take-out electrodes may be in the form of, for example, lead wires or foils.

Though not shown in the FIGURE, it is desired that the all-solid-state secondary battery is, further, provided with a water-barrier layer on the outer side of the sealer to cover at least part of the all-solid-state secondary battery. The water-barrier layer is a layer having a function for suppressing the permeation of water from the exterior. Upon being provided on the outer side of the sealer, the water-barrier layer suppresses the water in the atmosphere from entering into the all-solid-state secondary battery and, therefore, more effectively suppresses the generation of the hydrogen sulfide.

The water-barrier layer can be, for example, a DLC coating or an inorganic vapor deposited film of alumina or silicon oxide. For example, there can be used a film obtained by laminating a resin layer on both surfaces of an EVOH layer or an alumina layer. There can be also used a material capable of adsorbing the water, such as $P_2O_5$, zeolite, silica gel or activated carbon. They can be used in a single kind or in two or more kinds in combination.

EXAMPLE

The amounts of the hydrogen sulfide generated by the all-solid-state secondary batteries shown in the FIGURE that use the sealers of the present invention were measured.

The sealers were the films obtained by blending a polyimide resin with the particulate fatty acid silver having a fatty acid (stearic acid) coordinated on the surfaces of three kinds of silver particles, each having a mean particle diameter of 10 nm, 100 nm or 1000 nm. The all-solid-state secondary batteries sealed with the above sealers were examined for their amounts of hydrogen sulfide generation.

The contents of the particulate fatty acid silver in the sealers were set to be 0% by mass, 0.0005% by mass, 0.001% by mass, 0.1% by mass, 0.5% by mass, 1% by mass and 5% by mass, respectively.

To measure the amounts of the hydrogen sulfide, each ten all-solid-state secondary batteries produced by using the same kind of the sealer were put into a 1000-cc desiccator which was then hermetically closed. The interior of the desiccator was equivalent to the atmosphere with the temperature being adjusted to be 26° C. and the humidity to be 80%. After left to stand for 30 days, the concentrations of the hydrogen sulfide were measured. The hydrogen sulfide was detected by using a hydrogen sulfide sensor (product number GX-2003 manufactured by Riken Keiki Co.). The results were as shown in Table 1.

TABLE 1

| | | Diameter of silver particles (nm) | | |
| --- | --- | --- | --- | --- |
| | | 10 | 100 | 1000 |
| Content (% by mass) | 5 | not detected | not detected | not detected |
| | 1 | not detected | not detected | not detected |
| | 0.5 | not detected | not detected | not detected |
| | 0.1 | not detected | not detected | not detected |
| | 0.001 | not detected | not detected | not detected |
| | 0.0005 | not detected | not detected | not detected |
| | 0 | | 0.6 cc/l | |

As will be obvious from the results shown in Table 1, no hydrogen sulfide was detected from the all-solid-state secondary batteries using the sealers that contained the particulate fatty acid silver in amounts of 0.0005% by mass, 0.001% by mass, 0.1% by mass, 0.5% by mass, 1% by mass and 5% by mass. On the other hand, the hydrogen sulfide was detected in an amount of 0.6 cc/l from the all-solid-state secondary batteries 10 having the sealers that were formed in the same manner but without being blended with the particulate fatty acid silver.

As described above, it was learned that generation of the hydrogen sulfide could be prevented when the all-solid-state secondary battery was fabricated by using the sealer that contained the particulate fatty acid silver in an amount of not less than 0.0005% by mass.

Though the present invention was described above by way of Examples, it should be noted that the invention can be further modified, substituted or changed in various other ways without departing from the technical spirit and scope of the invention.

DESCRIPTION OF REFERENCE NUMERALS 10 all-solid-state secondary battery
11 positive electrode collector
12 negative electrode collector
13 positive electrode
14 solid electrolyte
15 negative electrode
16 sealer
17 take-out electrode
18 take-out electrode

The invention claimed is:

1. A sealer for use in an all-solid-state secondary battery provided with a sulfur-containing solid electrolyte, characterized in that:
   the sealer contains a resin and a particulate fatty acid metal salt dispersed in the resin;
   the particulate fatty acid metal salt is a particulate fatty acid metal salt in which a fatty acid is coordinated on the surfaces of metal particles having a mean particle diameter of not more than 1000 nm; and
   the resin is at least the one selected from the group consisting of polymide, polymide-imide, polyether ether ketone (PEEK) and liquid crystal polymer (LCP).

2. The sealer according to claim 1, wherein the particulate fatty acid metal salt is contained in the sealer in an amount of from 0.0005 to 5% by mass.

3. The sealer according to claim 1, wherein the fatty acid in the fatty acid metal salt is at least the one selected from the group consisting of lauric acid, myristic acid, palmitic acid, oleic acid, linoleic acid, linolenic acid, stearic acid, arachidic acid and behenic acid.

4. The sealer according to claim 1, wherein the metal in the fatty acid metal salt is at least the one selected from the group consisting of silver, copper, nickel, cobalt, gold and palladium.

5. An all-solid-state secondary battery comprising a positive electrode, a negative electrode, the solid electrolyte arranged between the positive electrode and the negative electrode, and the sealer described in claim 1.

6. The all-solid-state secondary battery according to claim 5, further comprising a water-barrier layer that covers at least part of the sealer.

7. A method of producing a sealer for use in an all-solid-state secondary battery provided with a sulfur-containing solid electrolyte, the method comprising;
   mixing together a resin and a particulate fatty acid metal salt in which a fatty acid covers the surfaces of metal particles having a mean particle diameter of not more than 1000 nm, wherein
   the resin is at least the one selected from the group consisting of polymide, polymide-imide, polyether ether ketone (PEEK) and liquid crystal polymer (LCP).

* * * * *